(12) United States Patent
Yoshida

(10) Patent No.: US 8,243,350 B2
(45) Date of Patent: Aug. 14, 2012

(54) APPARATUS WITH IMAGE READING UNITS ARRANGED IN ZIGZAG MANNER FOR OBTAINING DIGITAL DATA TO GENERATE ONE-LINE IMAGE DATA

(75) Inventor: Masaaki Yoshida, Chiba (JP)

(73) Assignee: Seiko I Infotech Inc. (JP)

( * ) Notice: Subject to any disclaimer, the term of this patent is extended or adjusted under 35 U.S.C. 154(b) by 893 days.

(21) Appl. No.: 12/291,093

(22) Filed: Nov. 6, 2008

(65) Prior Publication Data
US 2009/0122370 A1    May 14, 2009

(30) Foreign Application Priority Data

Nov. 9, 2007  (JP) .................................. 2007-291685

(51) Int. Cl.
*H04N 1/46* (2006.01)

(52) U.S. Cl. ........ 358/509; 358/514; 358/515; 358/524; 358/540; 347/12; 347/117; 347/141

(58) Field of Classification Search .................. 358/509, 358/514, 524, 540; 347/12, 117, 141
See application file for complete search history.

(56) References Cited

U.S. PATENT DOCUMENTS

| 5,416,606 | A  | * | 5/1995  | Katayama et al. ............ 382/239 |
| 5,416,615 | A  | * | 5/1995  | Shirota ......................... 358/530 |
| 6,972,879 | B2 | * | 12/2005 | Ide .............................. 358/514 |
| 7,349,134 | B2 | * | 3/2008  | Kato ............................ 358/482 |
| 7,715,064 | B2 | * | 5/2010  | Yoshida et al. ............... 358/474 |
| 7,773,271 | B2 | * | 8/2010  | Yamada et al. ............... 358/474 |
| 7,911,662 | B2 | * | 3/2011  | Inada ............................ 358/482 |
| 2004/0004655 | A1 | * | 1/2004  | Kamoshida et al. .......... 347/117 |
| 2007/0206244 | A1 | * | 9/2007  | Kobayashi .................... 358/514 |
| 2007/0285730 | A1 | * | 12/2007 | Suzuki et al. ............... 358/3.24 |
| 2009/0033699 | A1 | * | 2/2009  | Han .............................. 347/12 |

FOREIGN PATENT DOCUMENTS

| JP | 62 258553 | 11/1987 |
| JP | 1806913   | 11/2007 |

OTHER PUBLICATIONS

English Human Translation of JP 62-258553-A (Sugiura, Published Nov. 11, 1987).*

* cited by examiner

*Primary Examiner* — Benny Q Tieu
*Assistant Examiner* — Juan Guillermety
(74) *Attorney, Agent, or Firm* — Adams & Wilks

(57) ABSTRACT

In a color reading apparatus for successively reading respective red, green, and blue colors in each line while a document is continuously conveyed to a plurality of line sensor units arranged in a zigzag manner, the line sensor units are arranged with a distance equal to or shorter than a unit of line to prevent a color shift. When read data of the plurality of line sensor units in a conveying direction are to be combined, image data shifted by the number of lines corresponding to distances between the line sensor units in the conveying direction are set as first combination candidates. A color code and a line code are added to each of the data. Image data having the same color code and the same line code are combined. According to the image reading apparatus structured as described above, it is possible to obtain data capable of reproducing read data for each color on the same line without errors.

15 Claims, 6 Drawing Sheets

APPARATUS WITH IMAGE READING UNITS ARRANGED IN ZIGZAG MANNER FOR OBTAINING DIGITAL DATA TO GENERATE ONE-LINE IMAGE DATA

BACKGROUND OF THE INVENTION

1. Field of the Invention

The present invention relates to an image reading apparatus in which read data between a plurality of image reading sensor units are combined. In particular, the present invention relates to an image reading apparatus in which a plurality of image reading sensor units are arranged in a zigzag manner.

2. Related Background Art

With respect to conventional technologies, a conventional technology for correcting the amount of shift in a direction orthogonal to an arrangement direction of sensor arrays arranged in a zigzag manner is disclosed in JP 62-258553 A. According to this technology, storing means having a data storage region corresponding to each of the sensor arrays is used and read data is stored in a storage region designated by an address determined based on the amount of shift. Circular addressing is used for memory saving.

However, in the conventional technology, the correction is performed in a unit of line for each of the sensor arrays arranged in the zigzag manner, and hence no adjustment is performed based on a distance equal to or shorter than a distance between lines. In a case of a color reading apparatus for successively reading respective red, green, and blue colors in each line while a document is continuously conveyed, only the adjustment performed merely in a unit of line as in the conventional technology may cause a color shift. In other words, when the continuously conveyed document is to be subjected to color reading, the red, green, and blue colors are read for each line in order. Therefore, a read timing is shifted among the red, green, and blue colors. In addition, data is read at different timings among the respective sensor arrays. Thus, even when the adjustment is performed for each line, a read color may be different from a corresponding color of the document, and hence the accurate color of the document cannot be reproduced.

SUMMARY OF THE INVENTION

According to the present invention, there is provided an image reading apparatus in which a plurality of image reading units for reading a document continuously conveyed are arranged in a zigzag manner, the image reading units read reflection light for each color on the document by photoelectric conversion elements arranged in line while light sources having a plurality of colors are successively turned on and off, to obtain digital data, and the digital data associated with the respective image reading units are combined to generate one-line image data, the digital data each including color data indicating one of the colors of the light sources used to obtain the digital data and read period data indicating one of capture periods of the digital data, the image reading apparatus comprises: first image detecting means for detecting, from the digital data obtained by reading by the image reading units, the digital data having the color data indicating a predetermined color and the read period data indicating a predetermined capture period; a memory including a plurality of addresses and corresponding storage regions, for storing, for each of the addresses, the digital data which is digital data determined based on a result obtained by detection by the first image detecting means, has the same color data and the same read period data, and is obtained by reading by each of the image reading units; and image control means for combining the digital data associated with the respective image reading units which are stored in the storage regions corresponding to the addresses from the memory, to generate the one-line image data.

Further, in the image reading apparatus, the first image detecting means performs detection at read timings of the image reading units and adjusts a write timing of the digital data into the memory to a timing based on a read timing when the digital data having the predetermined color data and the predetermined read period data is detected.

Further, in the image reading apparatus, after the digital data is written into the memory at the write timing, the digital data obtained by reading by the image reading units are stored in the memory in synchronization with the read timings of the image reading units.

Further, in the image reading apparatus, an offset value is determined in advance based on a read line width of the image reading apparatus relative to an interval in a conveying direction between the image reading units arranged in the zigzag manner, and an address for starting storage of the digital data into the memory is determined based on the offset value.

Further, in the image reading apparatus, the offset value is determined based on an interval between a reference image reading unit which is one of the image reading units arranged in the zigzag manner and another one of the image reading units.

Further, in the image reading apparatus, color data has at least three values corresponding to three colors of red, green, and blue, and the read period data has at least four values larger than the number of colors recognized by the color data and is set to a value such that the digital data obtained by reading does not overlap with data of preceding and succeeding read lines.

According to the image reading apparatus of the present invention, the image data obtained by reading the colors on the same line can be read without errors. Therefore, the image data faithfully reproducing the read document can be obtained.

DETAILED DESCRIPTION OF THE PREFERRED EMBODIMENTS

Figure 1:
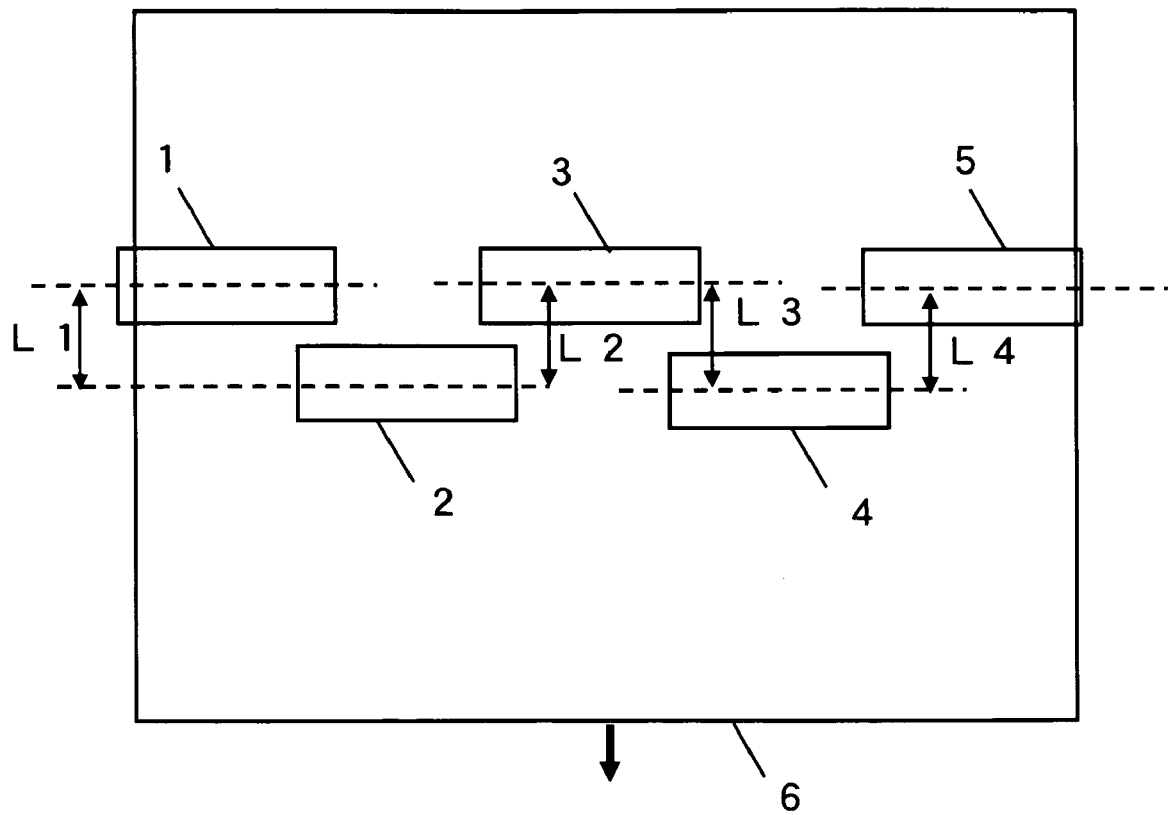
FIG. 1 is an arrangement view showing an image reading unit.

FIG. 1 is an arrangement diagram showing image reading units. A contact image sensor unit is used as each of the image reading units. Hereinafter, the contact image sensor unit is referred to as a CIS. Five CISs, that is, a CIS-A 1, a CIS-B 2, a CIS-C 3, a CIS-D 4, and a CIS-E 5 are arranged in a zigzag manner to read a document 6 conveyed in a direction indicated by an arrow. Red, green, and blue LEDs are arranged in each of the CISs. The LEDs are used as light sources. Approximately 5,000 photoelectric conversion elements are arranged in line. Light reflected on the document 6 is subjected to photoelectric conversion to read the document, and then converted into digital data. The respective CISs are arranged so as to overlap with each other in a conveying direction of the document 6, thereby performing overlap reading.

Because the CISs are arranged in the zigzag manner, intervals are provided between the sensor units arranged in the conveying direction of the document. Line differences indicating the number of lines corresponding to the intervals in a case where each line of reading is set as a unit area line difference L1, a line difference L2, a line difference L3, and a line difference L4. Data of the line differences are stored as line difference data in a memory. When the image data captured by the respective sensor units are to be combined, the line difference data are readout from the memory, and then adjacent data originally constituting one line are combined based on the line difference data. The image data located in positions in which the line difference data corresponding to a distance difference between the image reading units becomes 0 are combined to each other.

Figure 2:
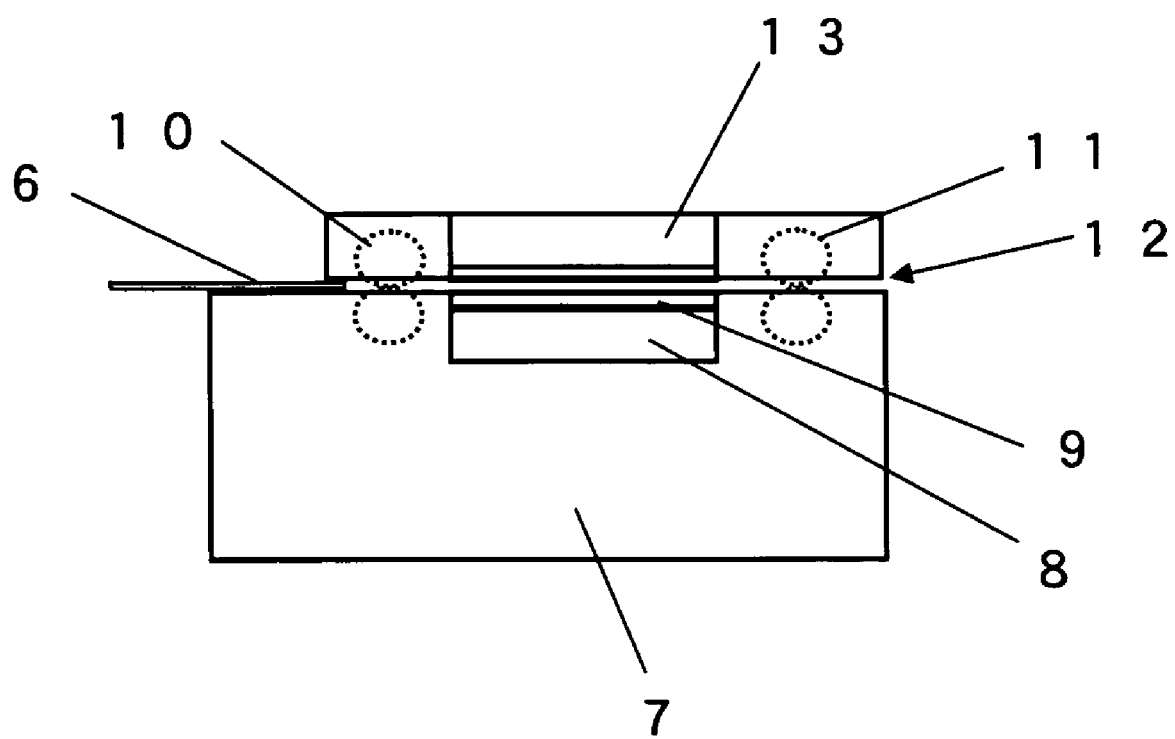
FIG. 2 is a schematic view showing an image reading apparatus.

FIG. 2 is a schematic view showing an image reading apparatus. A read portion 8 in which the five CISs are arranged in the zigzag manner is provided under a glass 9 in a case 7. A document base cover 13 is provided above the case 7 to block light from the outside. The document 6 taken into the apparatus is held by a first conveying roller pair 10 and a second conveying roller pair 11, conveyed at a constant speed, and delivered to a document outlet 12. The document 6 is read through the glass 9 by the read portion 8. In the image reading apparatus, the document 6 is conveyed at a constant speed and read by the document read portion 8 to generate image data.

Figure 3:
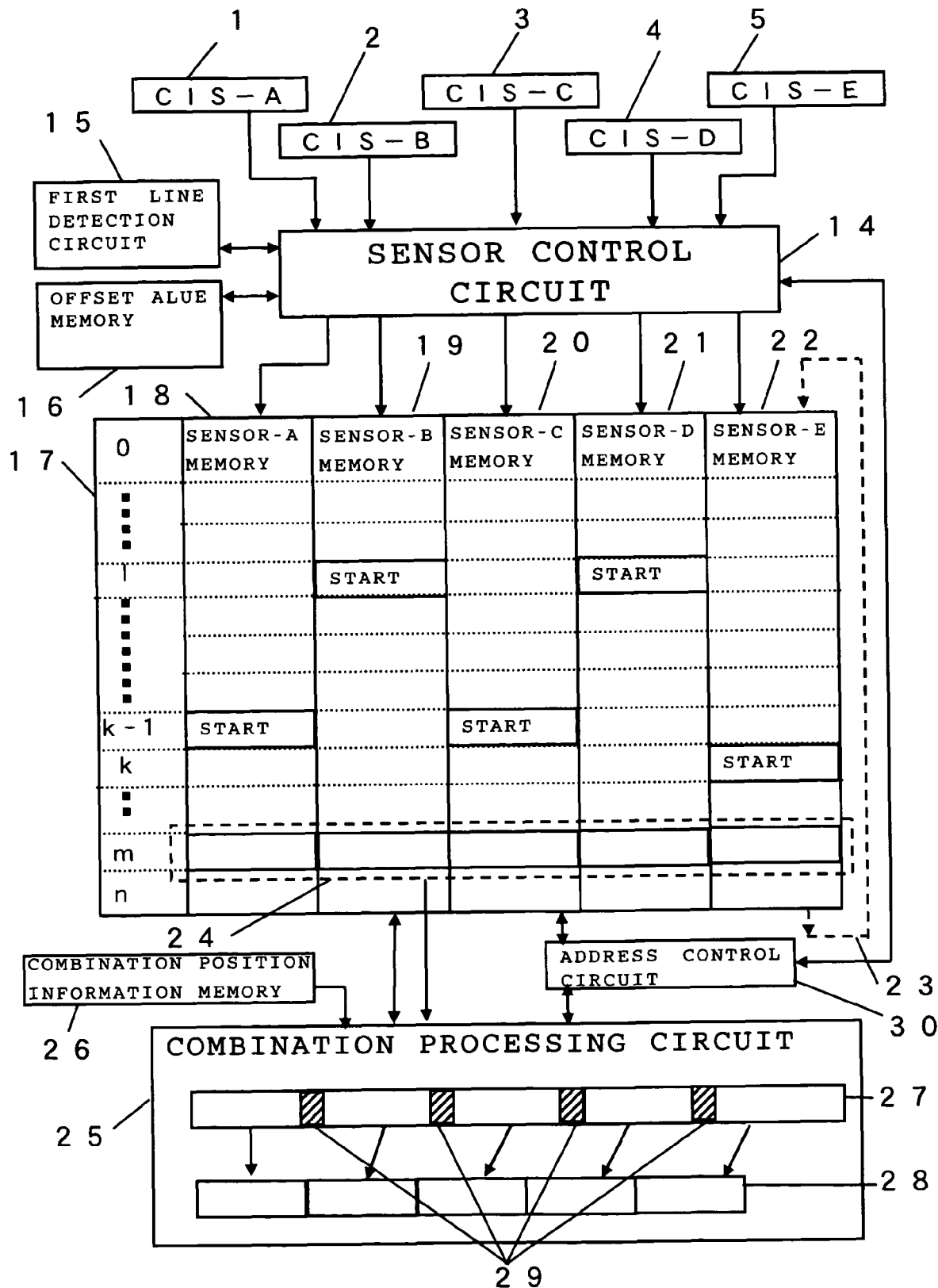
FIG. 3 is a block diagram showing an electrical structure of a read portion according to the present invention.

FIG. 3 is a block diagram showing an electrical structure of the read portion according to the present invention. Digital data of the document read by the respective CISs, that is, the CIS-A 1, the CIS-B 2, the CIS-C 3, the CIS-D 4, and the CIS-E 5 are output to a sensor control circuit 14. Color type data indicating read data obtained by turning on which color LED and a value (line number) obtained by circulating a value of 1 to 4 in order for each read line are added as a header to the digital data of the read document. The document is periodically read, and hence the line number is used as data indicating a read period.

A first line detection circuit 15 is a circuit for detecting data having a header predetermined with respect to data obtained by reading for each line and each color. An offset value memory 16 is a memory for storing line difference data corresponding to an interval between adjacent CISs of the CISs arranged in the zigzag manner.

A sensor control circuit 14 controls the respective CISs, processes data which are read and digitized by the CISs, and writes the data into an image memory 17. The image memory 17 includes a sensor-A memory 18 for storing an image for the CIS-A 1, a sensor-B memory 19 for storing an image for the CIS-B 2, a sensor-C memory 20 for storing an image for the CIS-C 3, a sensor-E memory 21 for storing an image for the CIS-D4, and a sensor-E memory 22 for storing an image for the CIS-E 5.

An address of the image memory 17 is an address 0 to an address n. In a data area designated by addresses, one-line image data read by each of the CISs is stored in a CIS memory for the corresponding CIS. An address control circuit 30 is a circuit for performing management and control so as to prevent an overlapped writing and overlapped reading to and from the image memory 17.

The sensor control circuit 14 starts data writing from an address of the image memory 17 which corresponds to each of the CISs based on a value stored in the offset value memory. For example, when line difference data from a reference point in the CIS-A 1 is 500 lines, the value of the offset value memory is 500, and hence data is written for each line from an address corresponding to a 500th line counted from the address 0. For example, in FIG. 3, an address k-1 is an address corresponding to the 500th line, and hence data is written from this address. Even in the case of each of the other CISs, data captured for each line from a position corresponding to line difference data from the reference is written. Writing of image data on each line starts from an address 1 in the CIS-B 2, from the address k-1 in the CIS-C 3, from the address 1 in the CIS-D 4, and from an address k in the CIS-E 5.

The first line detection circuit 15 determines, of read image data, first data to be stored in a first address for data writing.

The first line detection circuit 15 reads colors of data from the CISs and circulated line numbers, and compares predetermined header values to each other to find matched data. This is to detect data for starting writing to the image memory 17. The data for starting the writing to the memory 17 and a timing thereof are determined based on the data detected by the circuit. The read image data is written for each line from a region designated by the predetermined address of the memory at the determined timing. The image memory 17 is used while an address thereof is circulated.

An address of the image memory 17 is designated for each line. Consecutive other addresses are assigned for respective colors. For example, an address i is assigned to one-line data for red, a next address i+1 is assigned to one-line data for green, and a next address i+2 is assigned to one-line data for blue. Memory regions corresponding to three addresses are used for color to store one-line data.

A CIS which performs final reading in the conveying direction, of the CISs arranged in the zigzag manner, is a CIS corresponding to a maximum value of the offset value memory. When the writing of the image data corresponding to the CIS starts, one-line image data is completed. For example, data stored in a region corresponding to an address m of the image memory 17 is one-line data. One-line data obtained by reading by each of the CISs is stored in a region corresponding to the address m of each of the sensor-A memory 18, the sensor-B memory 19, the sensor-C memory 20, the sensor-D memory 21, and the sensor-E memory 22. When the address m is designated, data corresponding to the originally same line, which is obtained by reading by the respective CISs, can be designated.

Next, an overlap portion of the data in the arrangement direction of the CISs is processed. With respect to which part of the overlap portion is to be used, an overlap range is stored in advance in a combination position information memory 26. A combination processing circuit 25 first reads, into a one-line-combination pre-processing buffer 27, the one-line data read from the image memory 17. Data portions to be used, of the data from the CISs are designated based on the data of the combination position information memory 26, and hence overlap portion image data 29 which are unused portions are removed and resultant data portions are written into an one-line image data buffer 28.

When the data from all the CISs are combined, one-line image data is obtained. The combination processing circuit 25 successively writes the completed image data for each line into another memory to obtain read image data of the document by combination. The entire image data is transmitted for use to another apparatus such as a printing apparatus or an information processing apparatus. The image data can be transmitted to a recording medium and stored therein.

Examples of the image reading apparatus include an image scanner, a copying machine, and a facsimile machine.

Figure 4:
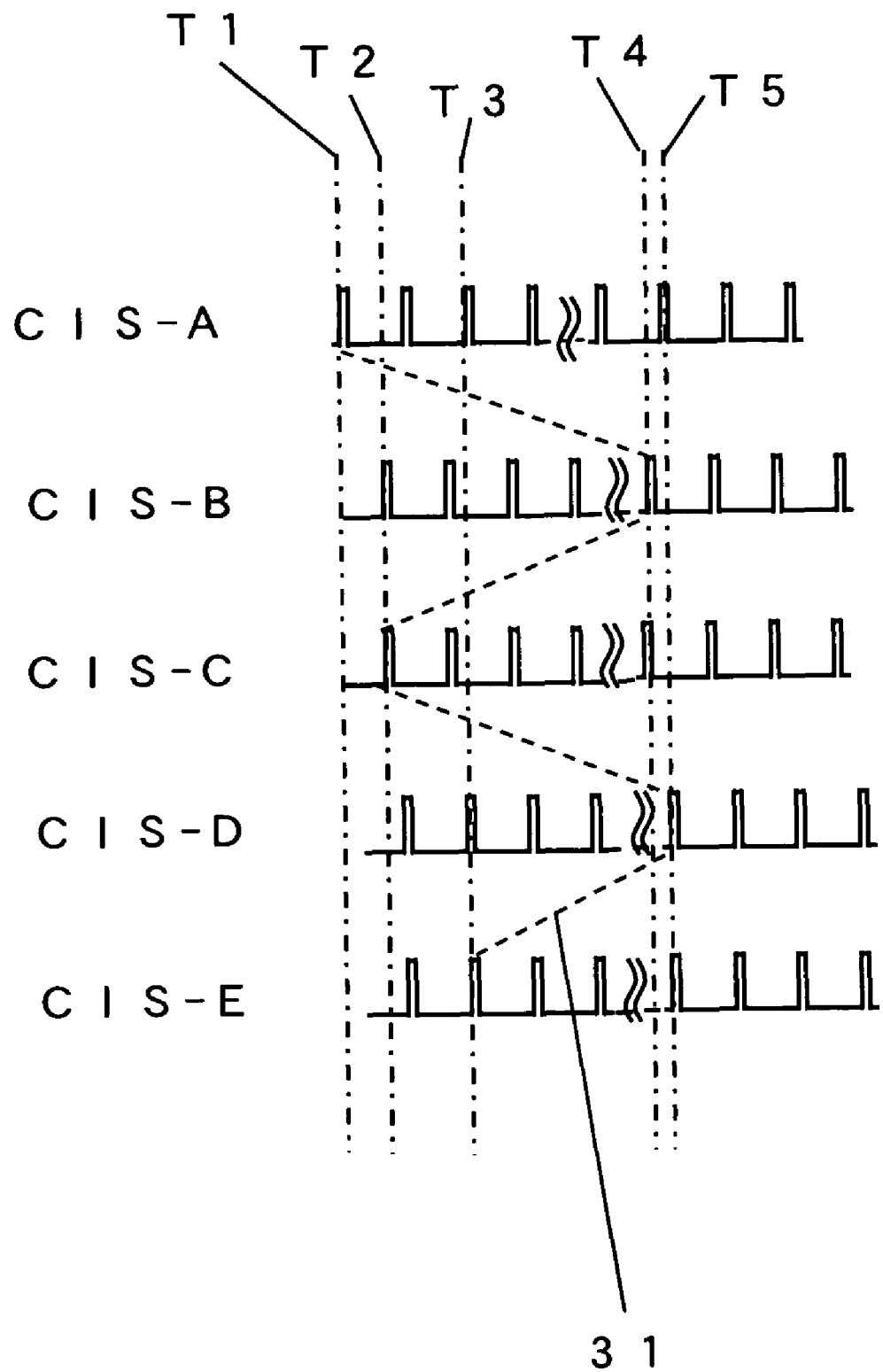
FIG. 4 is a read timing chart for respective CISs.

Next, a read timing of each of the CISs is described. FIG. 4 is a read timing chart of the respective CISs. Read timings of the respective CISs are shown. The respective CISs successively read respective colors of red, green, and blue on a line. FIG. 4 shows signals, each of which indicates the start of reading of each of the CISs for each line. The rising of each of the signals is detected to turn on LEDs of respective colors of red, green, and blue in order, thereby reading the document for each of the colors. This figure shows only the signals indicating the start of reading for red. The same signals are used for green and blue. The signals for each of three colors are risen at equal intervals. A signal for one of the colors is risen between the risings of signals for the others thereof. Reading for the respective colors is started in response to the respective signals. Read start signals for green and blue are omitted here. A signal rising interval is determined in advance such that three-color reading is completed before the next rising of the read start signal for red. The read timings of the respective CISs are non-synchronous (asynchronous).

The rising of each of the signals as indicated by a broken line 31 in FIG. 4 is a timing for reading the originally same line. The respective CISs are arranged in the zigzag manner, and hence the timings are shifted correspondingly to the arrangement. For example, a time T1 of the CIS-A, a time T4 of the CIS-B, a time T2 of the CIS-C, a time T5 of the CIS-D, and a time T3 of the CIS-E are read times of the respective CISs which are required to obtain the originally same line. The read interval is an equal interval, and hence it can be also said that the time difference exhibits the line difference among the arranged CISs. The amount of shift between the predetermined reference point and the originally same line to be obtained by the respective CISs, that is, the line difference data is stored in advance in the offset value memory 16.

Primary correction is performed based on the line difference data. Of data, read data to be originally adjacent are determined. Note that it is likely to cause an error of 1 line in maximum because of a unit of line interval. Therefore, it is necessary to more finely combine read data in accordance with the read timings among the respective CISs.

Figure 5:
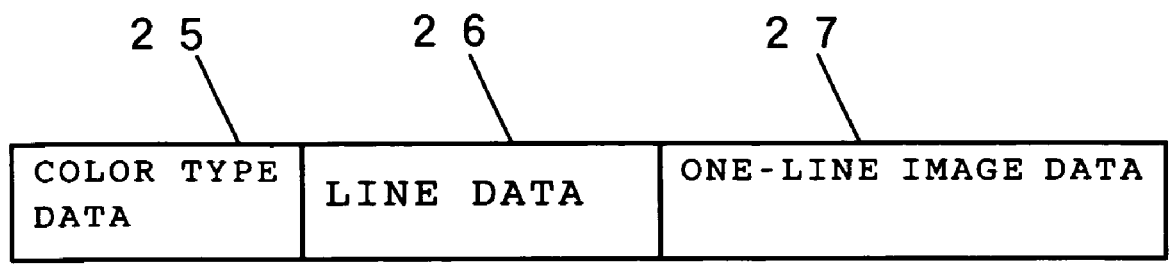
FIG. 5 is a structural diagram showing data output from each of the CISs.

FIG. 5 shows a structure of read data output from each of the CISs. This is data obtained by adding, to one-line image data 27 which is digital data read by the CIS, color type data 25 indicating read data obtained by turning on which color LED used as the light source and line data 26 indicating nth data, as header data.

Three bits are used for the color type data. For example, "110" is used for red, "101" is used for green, and "011" is used for blue. A read color is indicated by a bit whose value is 0. Two bits are used for line data. Four lines are indicated by four values of "00", "01", "10", and "11" and circulated for use. Three-color data are used for each line. Therefore, when data corresponding to four lines are used, whether data is data corresponding to an adjacent line for the same color or data corresponding to the same line can be determined. When subsequent processing is performed during this procedure, the preceding and succeeding lines are not confused.

Figure 6:
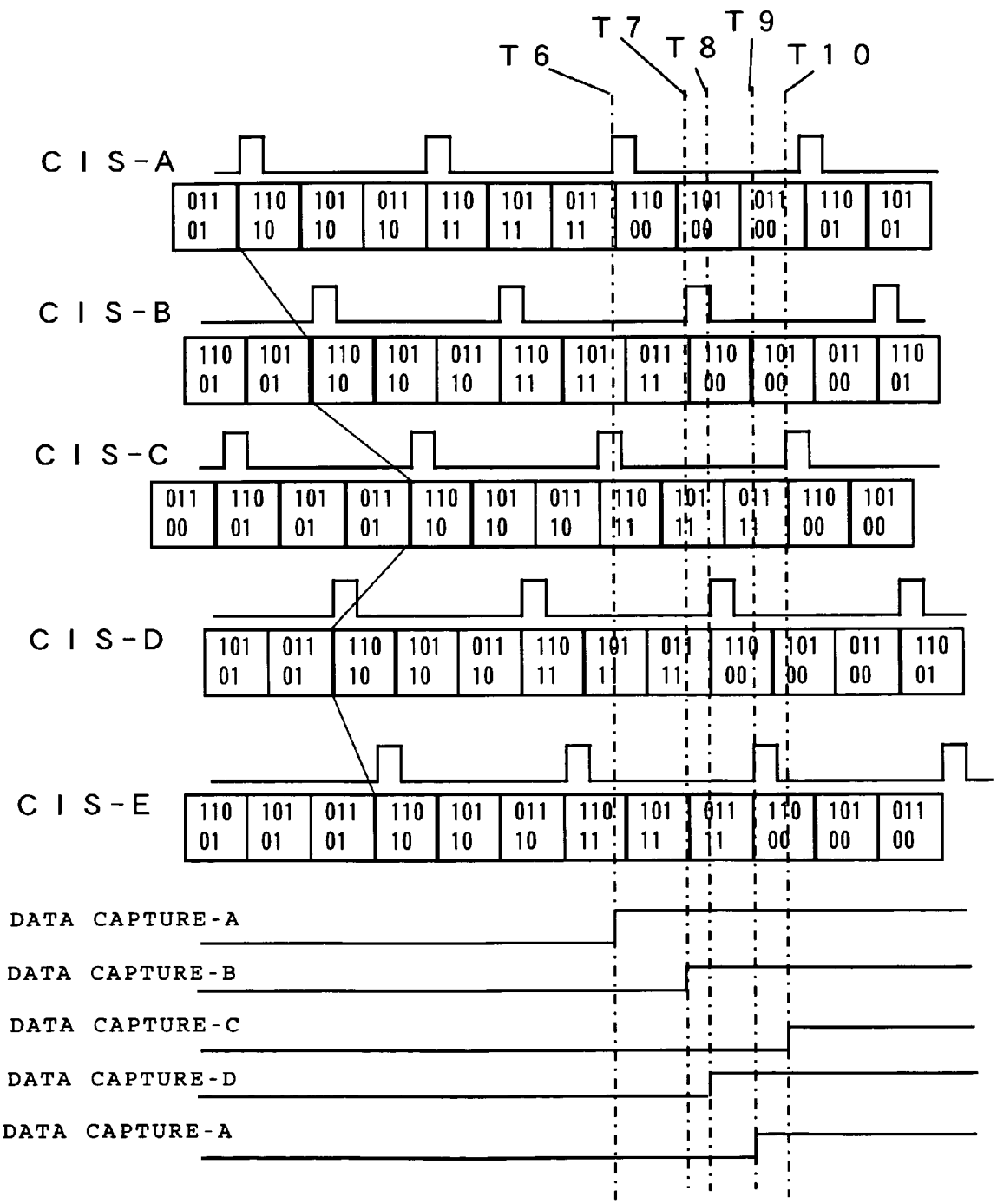
FIG. 6 is a schematic explanatory diagram showing data correction after primary correction.

FIG. 6 is a schematic explanatory diagram showing data correction after the primary correction. This shows read timings of the CISs for each line, and the color type data and the line data which are added to the read line data. Even in the following description, only a signal for red (R) is used as the read start signal. This also shows timings when image data from the respective CISs are written into the image memory 17.

Assume that reference CIS is the CIS-A 1. When reading for a line starts, the first line detection circuit 15 operates. Then, data from the CIS-A 1 is read and detection continues until predetermined color type data is the red color indicated by "110" and data which is the line data "10" is read. After the detection, the first line detection circuit 15 writes, into corresponding predetermined addresses of the image memory 17, read data from all the CISs on a line in which the color type data is the red color indicated by "110" and the line data is "00" after the next. Even in a case of image data on subsequent lines, the writing is performed with successive addresses in response to timings based on the read timings. For example, the writing is performed in synchronization with the read timings.

In the case of the CIS-A, from the rising of data capture-A, data for each line from the address k-1 of the sensor-A memory is written for each next rising of the image read interval from the rising of T6 in the CIS-A as shown in FIG. 6. Similarly, image data are written into the image memory 17 from predetermined addresses at predetermined timings from T7 in the CIS-B, from T8 in the CIS-D, from T9 in the CIS-E, and from T10 in the CIS-C. The lines to be originally combined are stored in the same address region. With respect to other read data for green and blue, data writing is performed in response to the read timings as in the case of red.

That is, when the reading of the document starts, the first line detection circuit 15 monitors the color type data and the line data which are added to the image data from the reference CIS. When predetermined line data of predetermined color type data is detected, the color type data and the line data which are added to the image data are monitored on read data for each line, of the respective image data from all the CISs. In this case, whether or not line data after the next of the predetermined line data of the predetermined color type data is detected is monitored. When the data is detected, the image data for each line are successively stored in a region of the image memory 17 which corresponds to the CIS which detects the data, from the address determined based on the line difference data stored in the offset value memory 16. After that, the read image data are stored at predetermined timings. For example, read data are stored in the memory in synchronization with the image read timings.

The image data of the same line are stored in the same address region. The reason why the line data after the next of the predetermined line data of the predetermined color type data is detected is as follows. Although correction in a unit of line is performed as correction between lines, a capture period for each color is not corrected. Therefore, when a processing time is included, it is likely to cause a delay corresponding to a maximum of three periods, and hence writing is started from data delayed by two periods. Thus, the writing may be performed from predetermined line data after two lines.

In other words, timings for reading on the originally same line by the CISs are varied among the respective CISs. Therefore, an error is corrected based on the write timings to the memory 17, and hence the read data of the originally same line is accurately reproduced.

Although the image data of the same line are stored in the same address region, the present invention is not limited thereto. For example, in order to extract image data of a desired line from separately stored image data, the image data captured by the respective CISs on the originally same line are marked in advance with identification codes to provide a correspondence relationship among data on the originally same line. A method of providing an identification code for each line and a method of adding a storage address of next data to be combined are also achieved. Therefore, in order to obtain desired one-line image data, the one-line image data can be obtained based on a designated address.

What is claimed is:

1. An image reading apparatus including a plurality of image reading units arranged in a zigzag manner and each configured to undergo a reading operation to read a document continuously conveyed to obtain digital data by reading reflection light for each color on the document by photoelectric conversion elements arranged in line while light sources having a plurality of colors are successively turned on and off, the image reading apparatus comprising:
   first image detecting means for detecting the digital data at mutually asynchronous read timings of the respective image reading units, each detected digital data including color data having at least three values corresponding to three colors of red, green and blue and indicating a predetermined one of the colors of the light sources and including read period data indicating a predetermined one of capture periods of the digital data;
   an image memory including a plurality of addresses for storing in storage regions designated by the respective addresses the digital data obtained during a reading operation by each of the image reading units and detected by the first image detecting means; and
   image control means for combining the digital data associated with the respective image reading units and stored in the storage regions of the image memory to generate one-line image data.

2. An image reading apparatus according to claim 1; further comprising a control circuit that controls writing of the digital data into the image memory at a write timing; wherein the first image detecting means adjusts the write timing of the digital data into the image memory to a timing based on a corresponding read timing when the first image detecting means detects the digital data having the predetermined color data and the predetermined read period data is detected.

3. An image reading apparatus according to claim 2; wherein after the digital data is written into the image memory at the write timing under the control of the control circuit, the digital data obtained by corresponding reading operations of the image reading units are stored in the image memory in synchronization with the read timings of the image reading units.

4. An image reading apparatus according to claim 3; wherein the read period data has at least four values larger than the number of colors recognized by the color data and is set to a value such that the digital data obtained for a read line in a reading operation does not overlap with digital data obtained in preceding and succeeding read lines.

5. An image reading apparatus according to claim 2; further comprising an offset value memory for storing an offset value that is determined in advance based on a read line width of the image reading apparatus relative to an interval in a conveying direction between the image reading units arranged in the zigzag manner; and wherein an address included in the image memory for starting storage of the digital data into the image memory is determined based on the offset value stored in the offset value memory.

6. An image reading apparatus according to claim 5; wherein the offset value stored in the offset value memory is determined based on an interval between a reference image reading unit corresponding to one of the image reading units arranged in the zigzag manner and another one of the image reading units arranged in the zigzag manner.

7. An image reading apparatus according to claim 6; wherein the read period data has at least four values larger than the number of colors recognized by the color data and is set to a value such that the digital data obtained for a read line in a reading operation does not overlap with digital data obtained in preceding and succeeding read lines.

8. An image reading apparatus according to claim 5; wherein the read period data has at least four values larger than the number of colors recognized by the color data and is set to a value such that the digital data obtained for a read line in a reading operation does not overlap with digital data obtained in preceding and succeeding read lines.

9. An image reading apparatus according to claim 2; wherein the read period data has at least four values larger than the number of colors recognized by the color data and is set to a value such that the digital data obtained for a read line in a reading operation does not overlap with digital data obtained in preceding and succeeding read lines.

10. An image reading apparatus according to claim 1; wherein the read period data has at least four values larger than the number of colors recognized by the color data and is set to a value such that the digital data obtained for a read line in a reading operation does not overlap with digital data obtained in preceding and succeeding read lines.

11. An image reading apparatus comprising:
   a read portion having a plurality of reading units each for reading respective red, green and blue colors in each read line of a document that is continuously conveyed across the reading unit to generate image data including color data having values corresponding to the respective red, green and blue colors and including read period data indicating one of capture periods of the image data, the reading units being arranged in a zigzag manner relative to one another;
   a detection circuit that detects at mutually asynchronous read timings of the respective reading units the image data generated by the reading units;
   an image memory that stores the image data detected by the detection circuit; and
   a processing circuit that combines the image data stored by the image memory to generate one-line image data.

12. An image reading apparatus according to claim 11; further comprising a control circuit that controls writing of the image data into the image memory at a write timing; wherein the detection circuit adjusts the write timing of the image data into the image memory to a timing based on a corresponding read timing when the detection circuit detects the image data.

13. An image reading apparatus according to claim 12; wherein after the image data is written into the image memory at the write timing under the control of the control circuit, the image memory stores the image data in synchronization with the read timings of the reading units.

14. An image reading apparatus according to claim 12; further comprising an offset value memory that stores an offset value that is determined in advance based on a read line width of the image reading apparatus relative to an interval in a conveying direction between the reading units arranged in the zigzag manner.

15. An image reading apparatus according to claim 14; wherein the offset value stored in the offset value memory is determined based on an interval between a reference reading unit corresponding to one of the plurality of reading units and a reading unit corresponding to another one of the plurality of reading units.

* * * * *